US006611975B1

(12) United States Patent
Ricketts

(10) Patent No.: US 6,611,975 B1
(45) Date of Patent: Sep. 2, 2003

(54) MOTORIZED BED ASSEMBLY

(76) Inventor: Roy D. Ricketts, 4 Heyford Cir., Santa Rosa, CA (US) 95401

( * ) Notice: Subject to any disclaimer, the term of this patent is extended or adjusted under 35 U.S.C. 154(b) by 119 days.

(21) Appl. No.: 09/791,207

(22) Filed: Feb. 23, 2001

(51) Int. Cl.[7] .......................... A61G 7/08; A61G 7/16; B60K 1/00; B60K 1/02

(52) U.S. Cl. ...................... 5/86.1; 5/81.1 R; 180/65.1; 180/65.5

(58) Field of Search .......................... 5/613, 600, 86.1, 5/81.1 R; 297/325, 329, 330; 280/250.1, 650; 180/6.5, 65.1, 65.5

(56) References Cited

U.S. PATENT DOCUMENTS 1,739,260 A * 12/1929 Roe .......................... 280/5.2
3,111,181 A * 11/1963 Yatich ........................ 180/6.5
3,191,990 A * 6/1965 Rugg et al. ................... 297/83
3,213,957 A * 10/1965 Wrigley ...................... 180/208
3,794,132 A * 2/1974 Moon ......................... 180/13
3,807,520 A * 4/1974 Chisholm ..................... 180/6.5
3,807,795 A * 4/1974 Weant et al. ............... 297/330
3,905,436 A * 9/1975 Karchak, Jr. et al. ........ 180/6.5
3,907,051 A * 9/1975 Weant et al. ............... 180/6.2
3,964,786 A * 6/1976 Mashuda
4,019,597 A 4/1977 Carmicheal
4,054,319 A * 10/1977 Fogg, Jr. et al. ............ 297/466
4,119,164 A * 10/1978 Fogg, Jr. et al. ............. 180/6.5
4,183,578 A * 1/1980 Naganawa .................. 297/90
4,333,681 A * 6/1982 Nelson ....................... 297/83
4,407,543 A * 10/1983 Mashuda .................... 297/330
4,503,925 A 3/1985 Palmer et al.
4,513,832 A * 4/1985 Engman ..................... 180/6.5
4,592,562 A * 6/1986 Strautnieks et al. ..... 280/250.1
4,613,151 A * 9/1986 Kielczewski ................ 280/650
4,614,246 A * 9/1986 Masse et al. ................ 180/6.5
4,809,804 A * 3/1989 Houston et al. ........... 180/65.5
4,949,408 A * 8/1990 Trkla ........................... 5/86.1
5,044,647 A * 9/1991 Patterson ................. 280/250.1
5,135,063 A 8/1992 Kropf
5,137,102 A * 8/1992 Houston, Sr. et al. ..... 180/65.5
5,193,633 A * 3/1993 Ezenwa ..................... 180/65.1
5,217,239 A * 6/1993 Koet ....................... 280/250.1
5,286,046 A * 2/1994 Bottemiller et al. ..... 280/47.38
5,346,280 A * 9/1994 Deumite ..................... 297/330
5,351,774 A * 10/1994 Okamoto ................... 180/65.1
5,366,036 A * 11/1994 Perry ........................ 180/65.1
5,445,233 A * 8/1995 Fernie et al. ................ 180/6.5
5,494,126 A 2/1996 Meeker
D372,798 S 8/1996 Robertson et al.
5,556,121 A * 9/1996 Pillot ....................... 280/304.1
5,575,348 A * 11/1996 Goertzen et al. .......... 180/65.6
5,580,207 A 12/1996 Kiebooms et al.
5,718,442 A * 2/1998 Alexander et al. ....... 280/250.1
5,772,226 A * 6/1998 Bobichon ................ 280/250.1
D397,645 S * 9/1998 Schaffner ................... D12/131
5,944,131 A * 8/1999 Schaffner et al. .......... 180/65.1
D413,554 S * 9/1999 Schlangen ................. D12/131
5,964,473 A * 10/1999 Degonda et al. ......... 280/250.1
5,971,482 A * 10/1999 Goertzen et al. ........... 297/329
5,996,716 A * 12/1999 Montiglio et al. ......... 180/65.5
6,003,891 A * 12/1999 Broadhead ............... 280/304.1
6,032,976 A * 3/2000 Dickie et al. ............... 280/650
6,070,898 A * 6/2000 Dickie et al. .......... 180/65.1 X
6,125,957 A * 10/2000 Kauffmann ................ 180/65.1
6,154,690 A * 11/2000 Coleman ....................... 701/1
6,176,335 B1 * 1/2001 Schaffner et al. .......... 180/65.1
6,186,252 B1 * 2/2001 Schaffner et al. .......... 180/65.1

(List continued on next page.)

*Primary Examiner*—Robert G. Santos

(57) ABSTRACT

A motorized bed assembly for allowing a user to easily transport individuals with various physical challenges. The motorized bed assembly includes a bed assembly that includes a support assembly and a frame assembly. The support assembly is pivotally coupled to the frame assembly. A drive assembly is coupled to the bed assembly such that the drive assembly is for propelling the bed assembly along a surface. A control assembly is operationally coupled to the drive assembly such that the control assembly is for controlling the drive assembly. The control assembly is coupled to the frame assembly of the bed assembly.

1 Claim, 3 Drawing Sheets

U.S. PATENT DOCUMENTS 6,196,343 B1 * 3/2001 Strautnieks .................. 180/22
6,199,647 B1 * 3/2001 Schaffner et al. .......... 180/65.1
6,231,067 B1 * 5/2001 Johnson et al. ............. 280/650
6,234,507 B1 * 5/2001 Dickie et al. .......... 180/65.1 X
6,276,704 B1 * 8/2001 Suiter ...................... 280/250.1
6,279,927 B1 * 8/2001 Nishihira et al. ............. 280/43
6,341,657 B1 * 1/2002 Hopely, Jr. et al. .......... 180/6.5
6,357,776 B1 * 3/2002 Goertzen et al. ........ 280/304.1
6,375,209 B1 * 4/2002 Schlangen ............... 280/250.1
6,409,265 B1 * 6/2002 Koerlin et al. .............. 297/325
6,425,635 B1 * 7/2002 Pulver ........................ 297/343
6,460,641 B1 * 10/2002 Kral .................... 280/250.1 X
6,543,798 B2 * 4/2003 Schaffner et al. ........ 280/250.1
2001/0011613 A1 * 8/2001 Schaffner et al. .......... 180/65.1

* cited by examiner

MOTORIZED BED ASSEMBLY

BACKGROUND OF THE INVENTION

1. Field of the Invention

The present invention relates to motorized beds and more particularly pertains to a new motorized bed assembly for allowing a user to easily transport individuals with various physical challenges.

2. Description of the Prior Art

The use of motorized beds is known in the prior art. More specifically, motorized beds heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,494,126; U.S. Pat. No. 4,019,597; U.S. Pat. No. 4,503,925; U.S. Pat. No. 5,135,063; U.S. Pat. No. Des. 372,798; and U.S. Pat. No. 5,580,207.

While these devices fulfill their respective, particular objectives and requirements, the aforementioned patents do not disclose a new motorized bed assembly. The inventive device includes a bed assembly that includes a support assembly and a frame assembly. The support assembly is pivotally coupled to the frame assembly. A drive assembly is coupled to the bed assembly such that the drive assembly is for propelling the bed assembly along a surface. A control assembly is operationally coupled to the drive assembly such that the control assembly is for controlling the drive assembly. The control assembly is coupled to the frame assembly of the bed assembly.

In these respects, the motorized bed assembly according to the present invention substantially departs from the conventional concepts and designs of the prior art, and in so doing provides an apparatus primarily developed for the purpose of allowing a user to easily transport individuals with various physical challenges.

SUMMARY OF THE INVENTION

In view of the foregoing disadvantages inherent in the known types of motorized beds now present in the prior art, the present invention provides a new motorized bed assembly construction wherein the same can be utilized for allowing a user to easily transport individuals with various physical challenges.

The general purpose of the present invention, which will be described subsequently in greater detail, is to provide a new motorized bed assembly apparatus and method which has many of the advantages of the motorized beds mentioned heretofore and many novel features that result in a new motorized bed assembly which is not anticipated, rendered obvious, suggested, or even implied by any of the prior art motorized beds, either alone or in any combination thereof.

To attain this, the present invention generally comprises a bed assembly that includes a support assembly and a frame assembly. The support assembly is pivotally coupled to the frame assembly. A drive assembly is coupled to the bed assembly such that the drive assembly is for propelling the bed assembly along a surface. A control assembly is operationally coupled to the drive assembly such that the control assembly is for controlling the drive assembly. The control assembly is coupled to the frame assembly of the bed assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorized bed assembly apparatus and method which has many of the advantages of the motorized beds mentioned heretofore and many novel features that result in a new motorized bed assembly which is not anticipated, rendered obvious, suggested, or even implied by any of the prior art motorized beds, either alone or in any combination thereof.

It is another object of the present invention to provide a new motorized bed assembly, which may be easily and efficiently manufactured and marketed.

It is a further object of the present invention to provide a new motorized bed assembly, which is of a durable and reliable construction.

An even further object of the present invention is to provide a new motorized bed assembly which is susceptible of a low cost of manufacture with regard to both materials and labor, and which accordingly is then susceptible of low prices of sale to the consuming public, thereby making such motorized bed assembly economically available to the buying public.

Still yet another object of the present invention is to provide a new motorized bed assembly which provides in the apparatuses and methods of the prior art some of the advantages thereof, while simultaneously overcoming some of the disadvantages normally associated therewith.

Still another object of the present invention is to provide a new motorized bed assembly for allowing a user to easily transport individuals with various physical challenges.

Yet another object of the present invention is to provide a new motorized bed assembly which includes a bed assembly that includes a support assembly and a frame assembly. The support assembly is pivotally coupled to the frame assembly. A drive assembly is coupled to the bed assembly such that the drive assembly is for propelling the bed assembly along a surface. A control assembly is operationally coupled to the drive assembly such that the control assembly is for controlling the drive assembly. The control assembly is coupled to the frame assembly of the bed assembly.

Still yet another object of the present invention is to provide a new motorized bed assembly that would fulfill a need for individuals who are unable to utilize a wheelchair or scooter to be transported.

Even still another object of the present invention is to provide a new motorized bed assembly that would allow the care provider to readily assist with the movement of the device. The present invention would be appropriately sized to fit inside a conventional mini-van eliminating the need to hire costly transport of private ambulance companies to transport the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
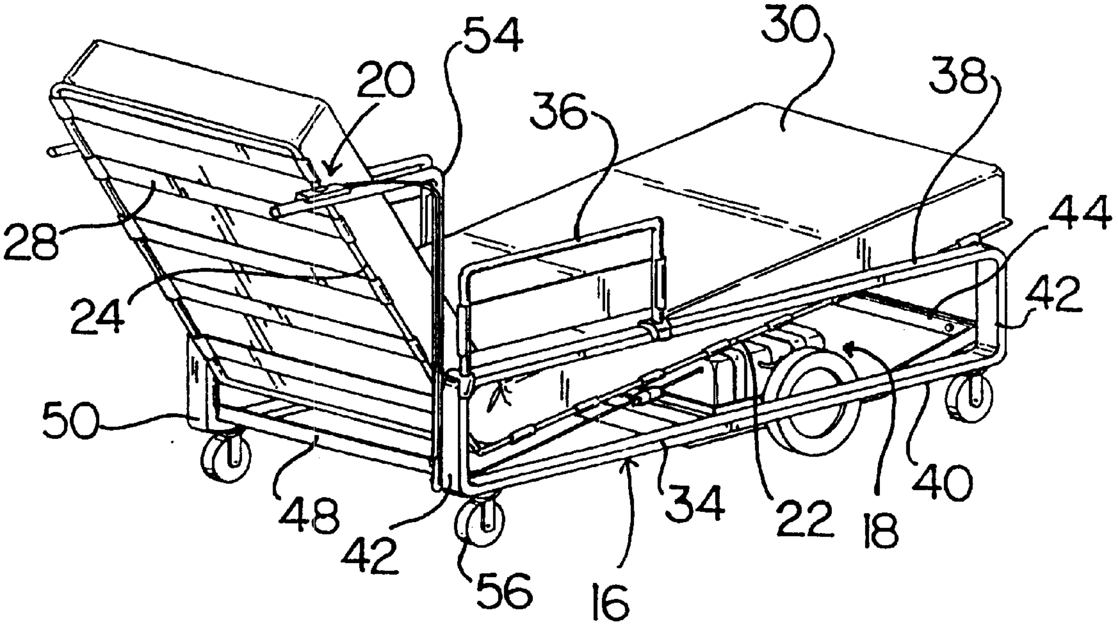
FIG. 1 is a perspective view of a new motorized bed assembly according to the present invention.
Figure 2:
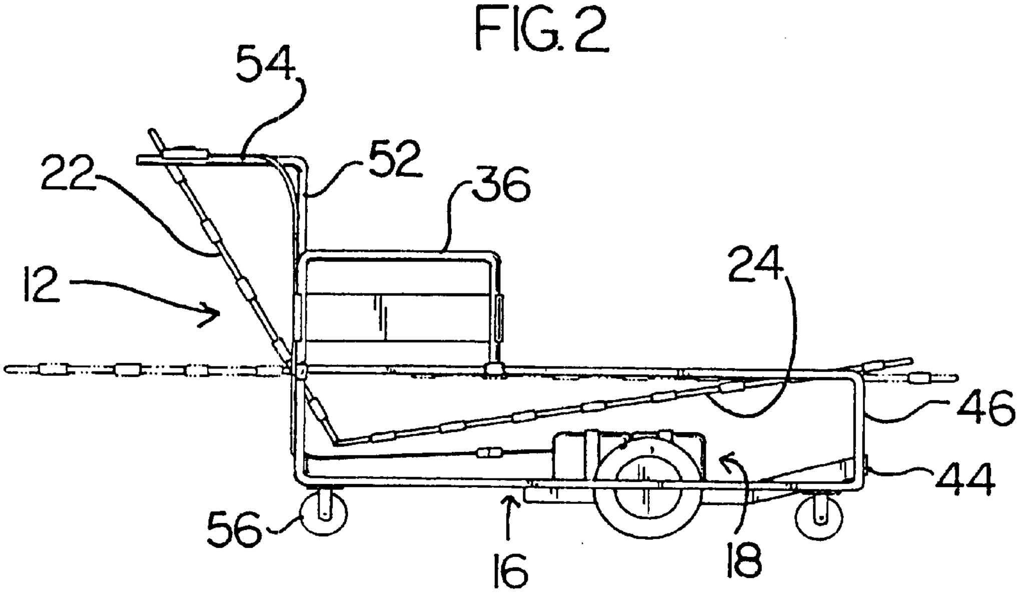
FIG. 2 is a side view of the present invention.
Figure 3:
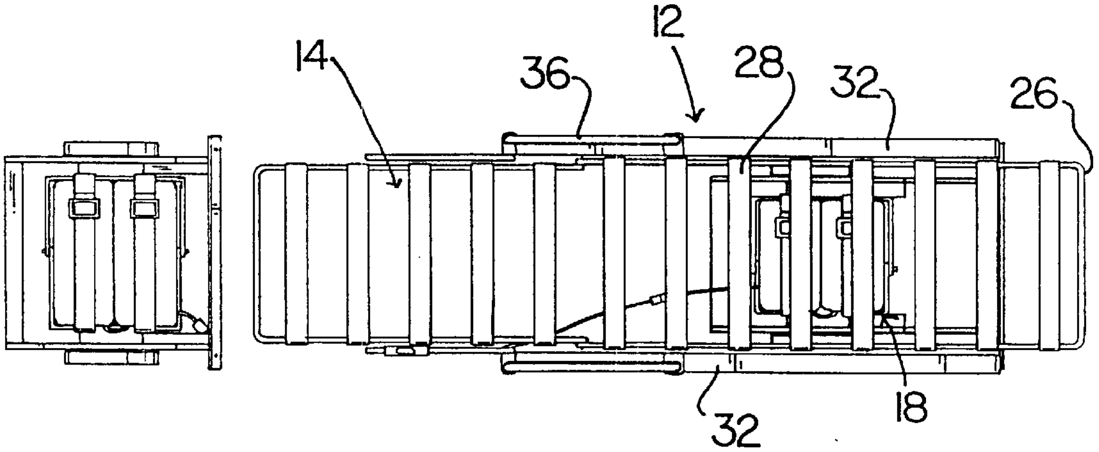
FIG. 3 is a top view of the present invention.
Figure 4:
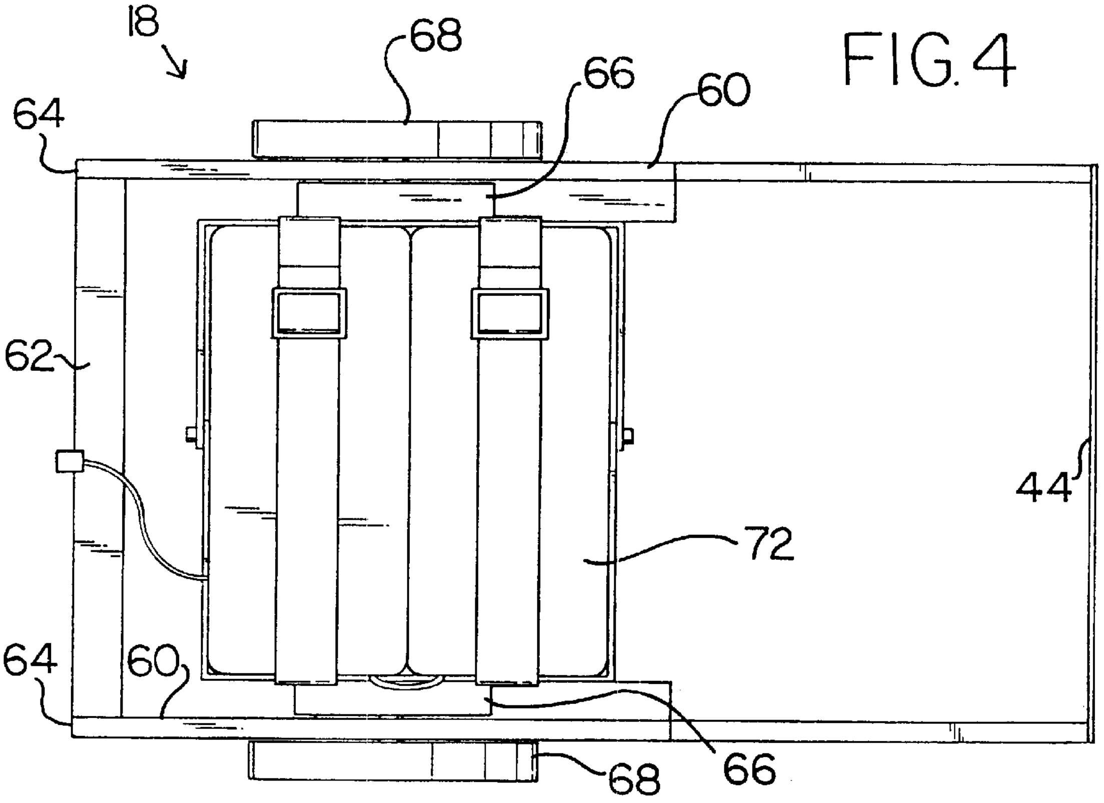
FIG. 4 is a top view of the present invention.
Figure 5:
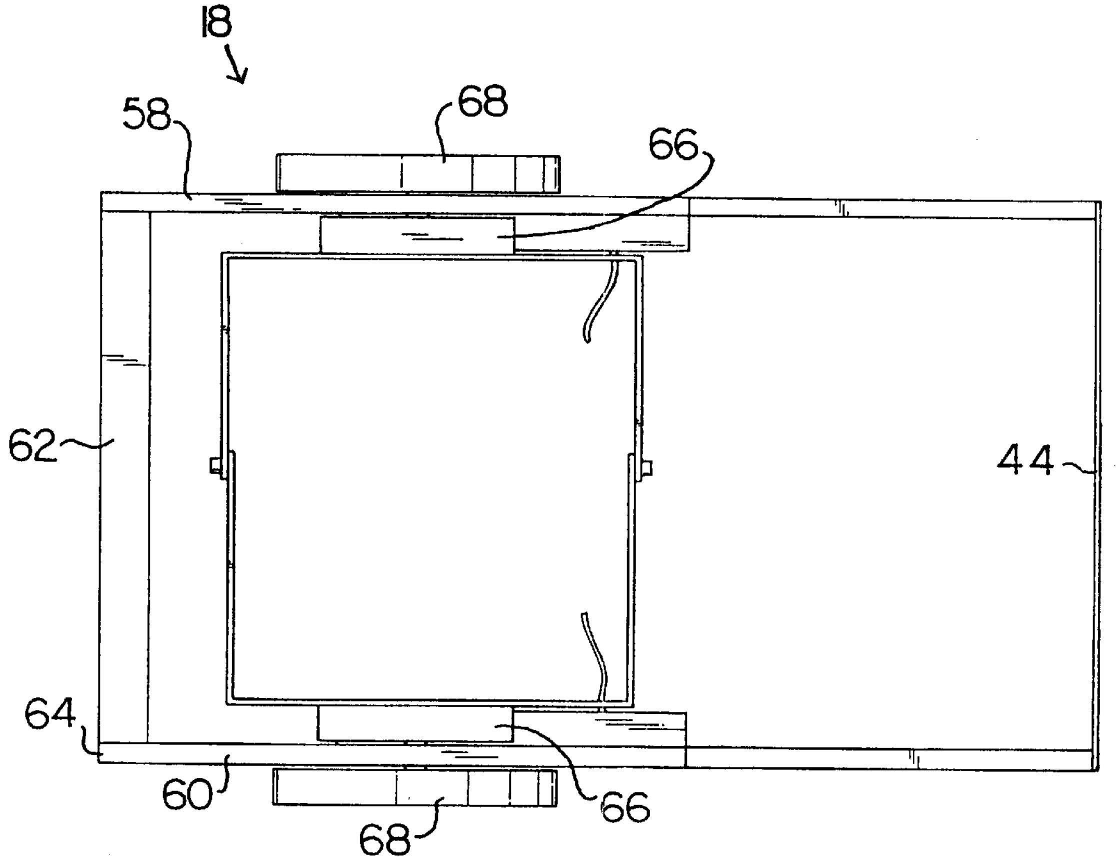
FIG. 5 is a top view of the present invention.

With reference now to the drawings, and in particular to FIGS. 1 through 5 thereof, a new motorized bed assembly embodying the principles and concepts of the present invention and generally designated by the reference numeral 10 will be described.

As best illustrated in FIGS. 1 through 5, the motorized bed assembly 10 generally comprises a bed assembly 12 that includes a support assembly 14 and a frame assembly 16. The support assembly 14 is pivotally coupled to the frame assembly 16. A drive assembly 18 is coupled to the bed assembly 12 such that the drive assembly 18 is for propelling the bed assembly 12 along a surface. A control assembly 20 is operationally coupled to the drive assembly 18 such that the control assembly 20 is for controlling the drive assembly 18. The control assembly 20 is coupled to the frame assembly 16 of the bed assembly 12.

The support assembly 14 has a first support portion 22 and a second support portion 24. The first support portion 22 is pivotally coupled to the second support portion 24 whereby the support assembly 14 is pivotable between an angled position and a coplanar position. The support assembly 14 has a perimeter frame 26 and a plurality of bracing members 28, each of the bracing members 28 is extended across a width of the perimeter frame 26 such that the bracing members 28 are adapted for supporting the user positioned on the support assembly 14.

A mattress 30 is positioned on the support assembly 14 and supported by the bracing members 28 such that the mattress 30 is adapted for providing comfort to the user when the user is positioned on the support assembly 14. The frame assembly 16 has a pair of side portions 32, each of the side portions 32 has a base 34 and an arm rest 36. The base 34 has a top member 38, a bottom member 40 and a pair of end members 42. The armrest 36 is coupled to the top member 38 of the base 34 such that the armrest 36 upwardly extends from the base 34 of the frame assembly 16.

A first stabilizing member 44 is coupled between each the bottom member 40 of the base 34 of each of the side portions 32 such that the first stabilizing member 44 is for stabilizing a front end 46 of the frame assembly 16. A second stabilizing member 48 is coupled between each the bottom member 40 of the base 34 of each of the side portions 32 such that the second stabilizing member 48 is for stabilizing a rear end 50 of the frame assembly 16.

The frame assembly 16 includes a pair of steering arms 52, one of the steering arms 52 is coupled to one of the side portions 32 of the frame assembly 16. Each of the steering arms 52 upwardly extends to the respective side portion 32, each of the steering arms 52 has an handle portion 54 that extends away from the respective side portion 32 such that the steering arms 52 are adapted for aiding in guiding of the bed assembly 12 by a user.

The control assembly 20 is coupled to the handle portion 54 of one of the steering arms 52 such that the control assembly 20 is easily accessed by the user guiding the bed assembly 12. A pair of guide wheels 56 are pivotally coupled to the frame assembly 16 of the bed assembly 12 such that the guide wheels 56 are for allowing the bed assembly 12 to be guided in direction desired by the user.

The drive assembly 18 has a motor frame 58 that is coupled to the frame assembly 16. The motor frame 58 has a pair of side members 60 and an end member 62 such that the end member 62 is positioned between a free end 64 of each of the side members 60. One of a pair of motors 66 is coupled to one of the side members 60, one of a pair of wheels 68 is operationally coupled to one of the motors 66 such that each of the motors 66 are for rotating one of the respective wheels 68. Each of the motors 66 is operationally coupled to the control assembly 20 such that the control assembly 20 is for controlling the motors 66. The drive assembly 18 has a power supply 72 operationally coupled between the control assembly 20 and the motors 66 such that the power supply 72 is for providing power to the motors 68 when the control assembly 20 is actuated.

In use, a user would use the present invention to transport patients to and from doctors, to visit friends and relatives and to visit outdoor events. The present invention would function as an adjustable bed as well as being easily mobile though the motorized controlling apparatus.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorized bed for transporting a user, the motorized bed comprising:

a bed assembly comprising a support assembly and a frame assembly, said support assembly being pivotally coupled to said frame assembly;

a drive assembly being coupled to said bed assembly such that said drive assembly is for propelling said bed assembly along a surface;

a control assembly being operationally coupled to said drive assembly such that said control assembly is for controlling said drive assembly, said control assembly being coupled to said frame assembly of said bed assembly;

wherein said support assembly has a first support portion and a second support portion such that said first support portion is pivotally coupled to said second support portion whereby said support assembly is pivotable between an angled position and a coplanar position;

wherein said support assembly has a perimeter frame and a plurality of bracing members, each of said bracing members being extended across a width of said perimeter frame such that said bracing members are adapted for supporting the user positioned on said support assembly;

a mattress positioned on said support assembly and supported by said bracing members such that said mattress is adapted for providing comfort to the user when the user is positioned on said support assembly;

wherein said frame assembly has a pair of side portions, each of said side portions having a base and an arm rest, said base having a top member, a bottom member and a pair of end members, said arm rest being coupled to said top member of said base such that said arm rest upwardly extends from said base of said frame assembly;

a first stabilizing member being coupled between each said bottom member of said base of each of said side portions such that said first stabilizing member is for stabilizing a front end of said frame assembly;

a second stabilizing member being coupled between each said bottom member of said base of each of said side portions such that said second stabilizing member is for stabilizing a rear end of said frame assembly;

wherein said frame assembly comprises a pair of steering arms, one of said steering arms being coupled to one of said side portions of said frame assembly, each of said steering arms upwardly extending from said respective side portions, each of said steering arms having an handle portion extending away from said respective side portion such that said steering arms are adapted for aiding in guiding of said bed assembly by a user;

wherein said control assembly is coupled to said handle portion of one of said steering arms such that said control assembly is easily accessed by the user guiding said bed assembly;

a front pair of guide wheels being pivotally coupled to said front end of said frame assembly of said bed assembly and a rear pair of guide wheels being pivotally coupled to said rear end of said frame assemble of said bed assembly for supporting said ends of said frame assembly independently of said drive assembly such that said frame assembly is movable on said front and rear pairs of guide wheels when said drive assembly is removed from connection to said frame assembly;

wherein said drive assembly has a motor frame being coupled to said frame assembly, said motor frame having a pair of side members and an end member such that said end member is positioned between a free end of each of said side members, one of a pair of motors being coupled to one of said side members, one of a pair of wheels of said drive assembly being operationally coupled to one of said motors such that each of said motors are for rotating one of said respective wheels for moving said bed assembly across a support surface, each of said wheels of said drive assembly being rotatably coupled to an associated one of said side members of said motor frame, said wheels of said drive assembly being located between said front pair of guide wheels and said rear pair of guide wheels, each of said motors being operationally coupled to said control assembly such that said control assembly is for controlling said motors; and wherein said drive assembly has a power supply operationally coupled between said control assembly and said motors such that said power supply is for providing power to said motors when said control assembly is actuated.

* * * * *